March 1, 1966  J. S. ELLIOTT ETAL  3,237,892
AIRCRAFT AERODYNAMIC LIFTING MEMBER
Filed Aug. 29, 1963  14 Sheets-Sheet 1
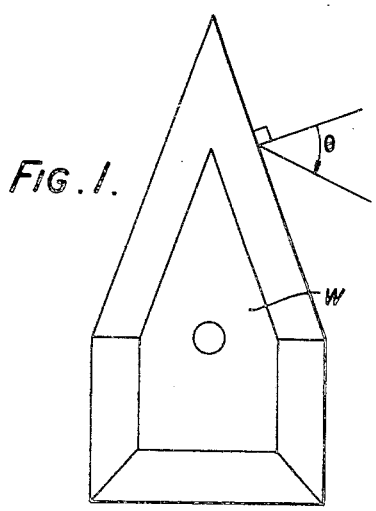
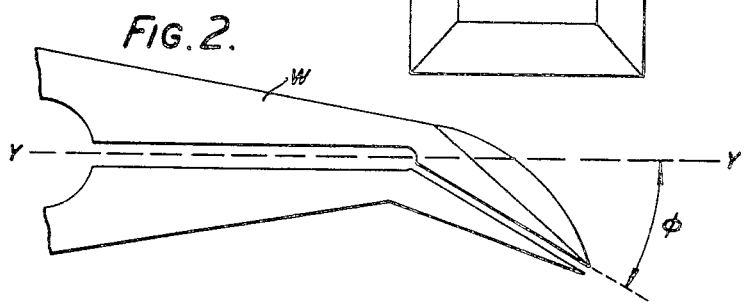
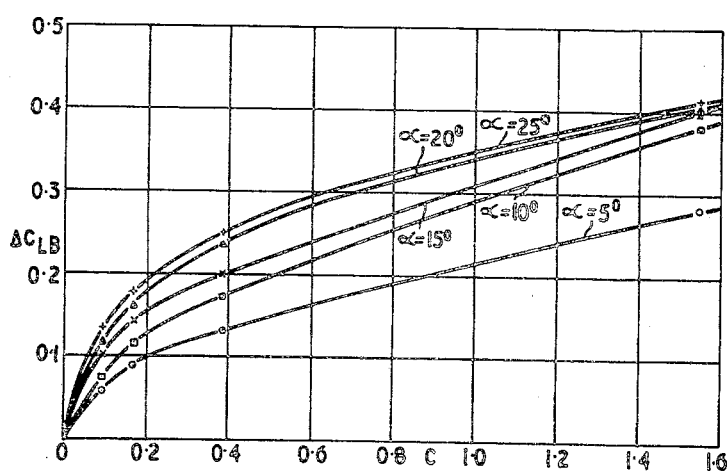
FIG. 3. VARIATION OF LIFT INCREMENT DUE TO BLOWING WITH MOMENTUM COEFFICIENT. BLOWING FROM ALL EDGES $\phi = 0°$
INVENTORS
John Smithurst Elliott
Geoffrey Michael Lilley
Alan John Alexander
John James Spillman
By Stevens, Davis, Miller & Mosher
ATTORNEYS

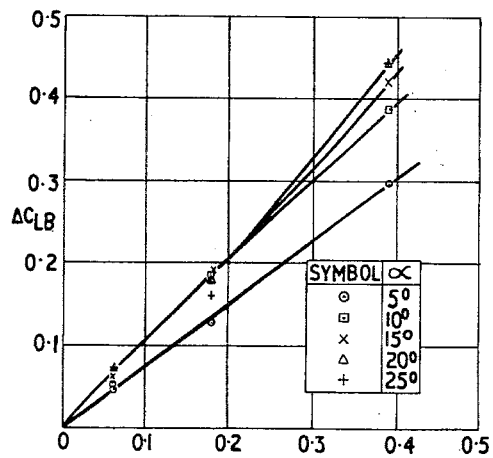
FIG. 4. VARIATION OF LIFT INCREMENT DUE TO BLOWING WITH MOMENTUM COEFFICIENT BLOWING FROM ALL EDGES $\phi=30°$
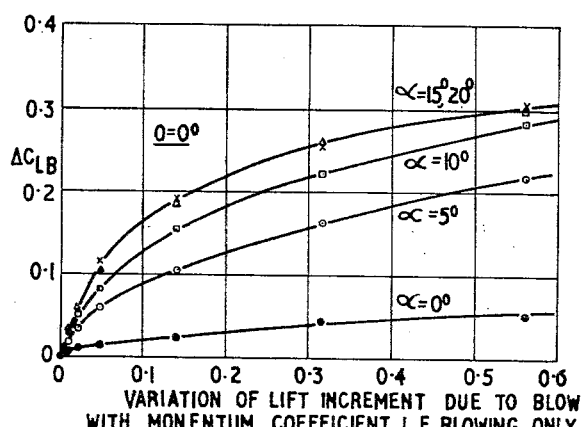
FIG. 5. VARIATION OF LIFT INCREMENT DUE TO BLOWING WITH MOMENTUM COEFFICIENT. L.E. BLOWING ONLY $\phi=\theta=0$

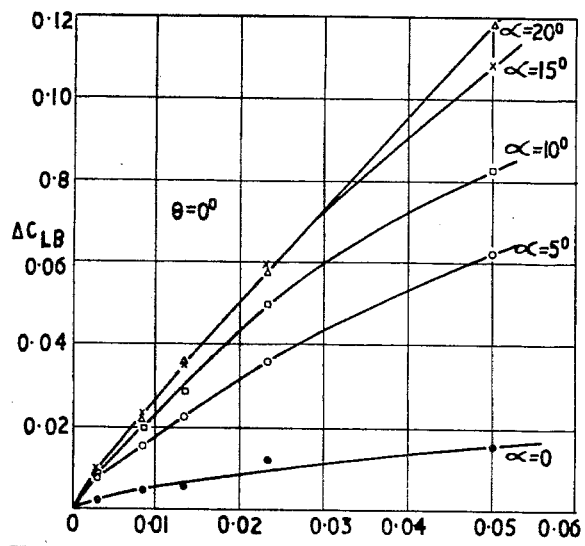
FIG. 6. VARIATION OF LIFT INCREMENT DUE TO BLOWING WITH MOMENTUM COEFFICIENT. L.E. BLOWING ONLY. 0 0 0.
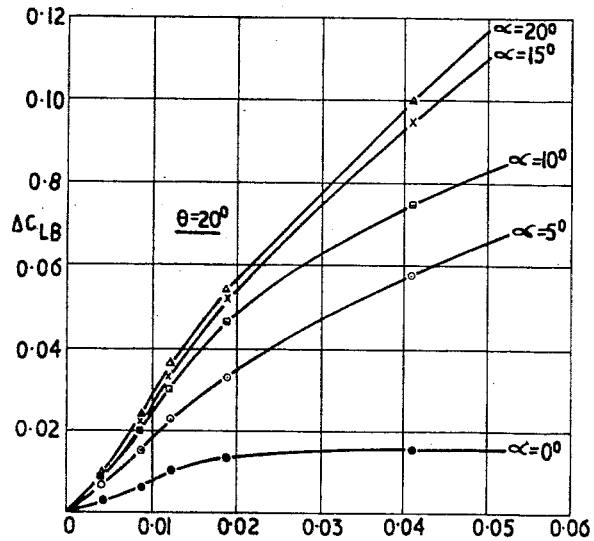
VARIATION OF LIFT INCREMENT DUE TO BLOWING WITH MOMENTUM COEFFICIENT. L.E. BLOWING ONLY. $\varnothing=0°$, $\theta=20°$
FIG. 7.
INVENTORS
John Smithurst Elliott
Geoffrey Michael Lilley
Alan John Alexander
John James Spillman
By Stevens, Davis, Miller & Mosher
ATTORNEYS

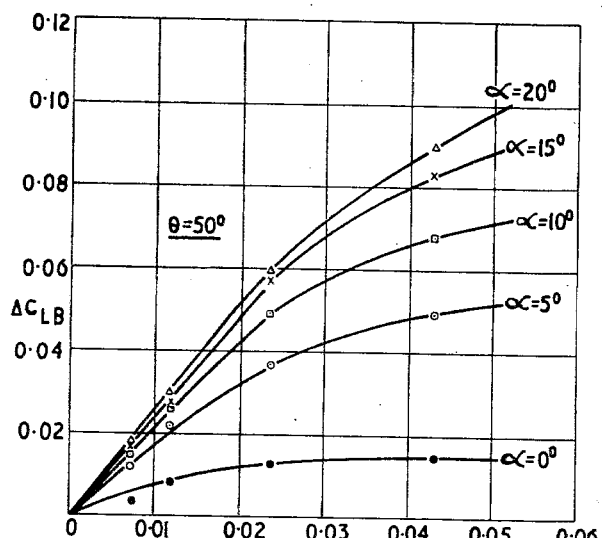
FIG. 8. VARIATION OF LIFT INCREMENT DUE TO BLOWING WITH MOMENTUM COEFFICIENT L.E. BLOWING ONLY. $\phi=0°, \theta=50°$
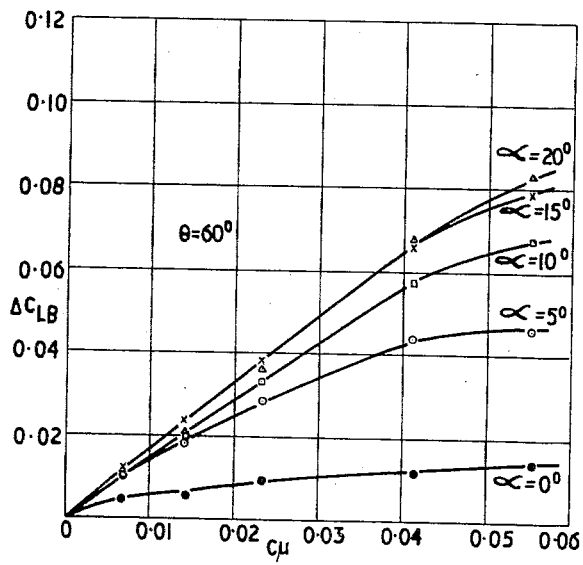
FIG. 9. VARIATION OF LIFT INCREMENT DUE TO BLOWING WITH MOMENTUM COEFFICIENT L.E. BLOWING ONLY. $\phi=0°, \theta=60°$

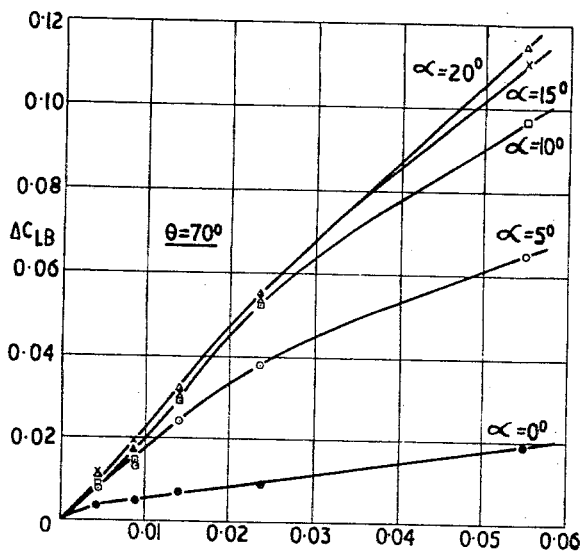
FIG. 10. VARIATION OF LIFT INCREMENT DUE TO BLOWING WITH MOMENTUM COEFICIENT L.E. BLOWING ONLY. $\phi=0, \theta=70°$.
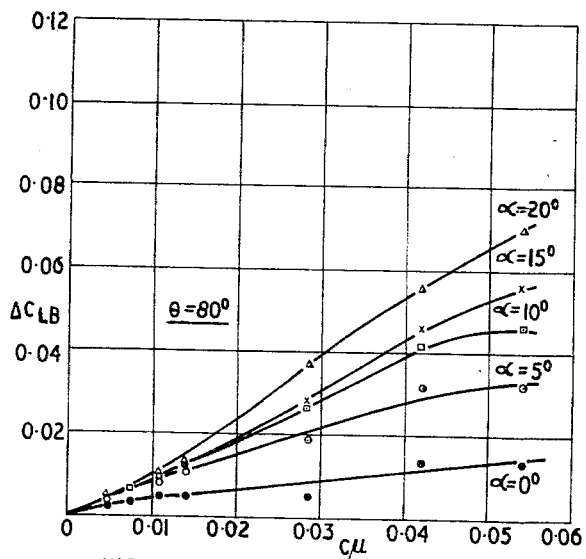
FIG. 11. VARIATION OF LIFT INCREMENT DUE TO BLOWING WITH MOMENTUM COEFFICIENT. L.E. BLOWING ONLY $\phi=0°, \theta=80°$

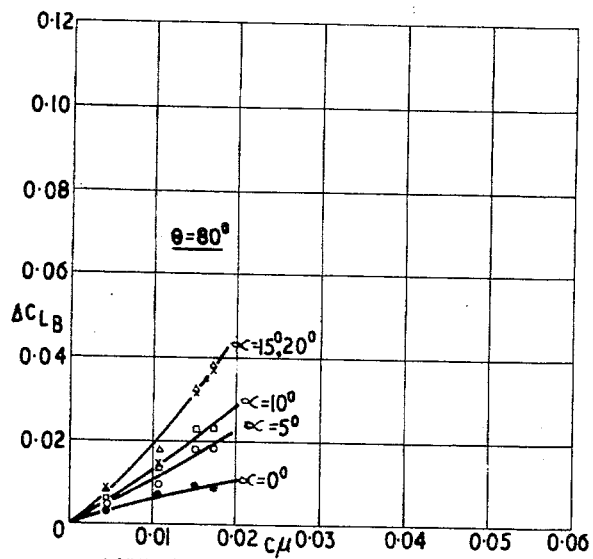
FIG. 12. VARIATION OF LIFE INCREMENT DUE TO BLOWING WITH MOMENTUM COEFICIENT. BLOWING FROM APEX. $\phi=0$, $\theta=80°$
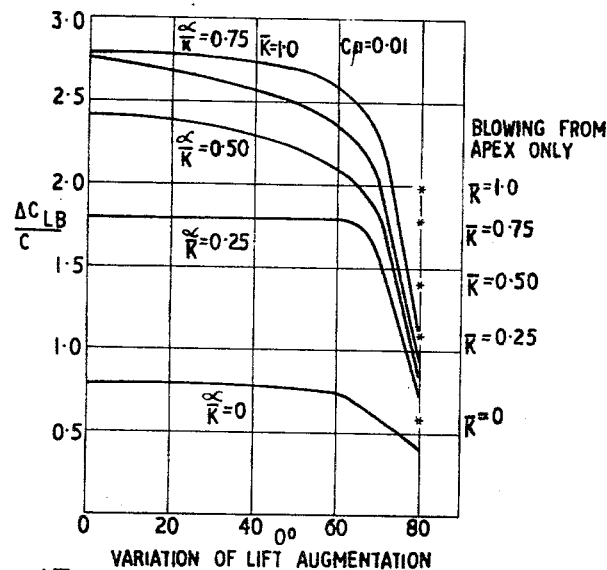
FIG. 13. VARIATION OF LIFT AUGMENTATION $\frac{\Delta C_{LB}}{C\mu}$ WITH JET SWEEP ANGLE $\theta$ $\phi=0$, $C\mu=0.01$
INVENTORS
John Smithurst Elliott
Geoffrey Michael Lilley
Alan John Alexander
John James Spillman

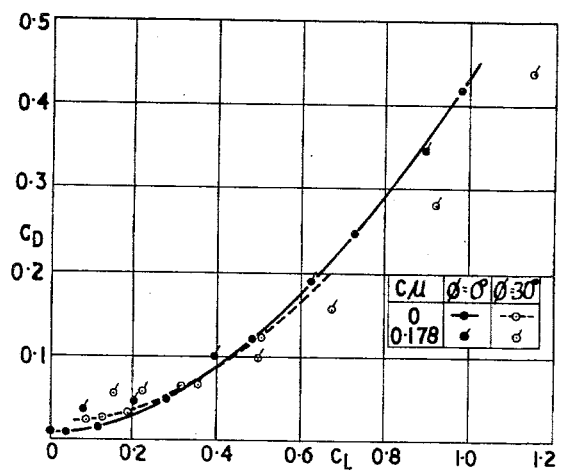
FIG. 14. VARIATION OF DRAG WITH LIFT BLOWING FROM ALL EDGES
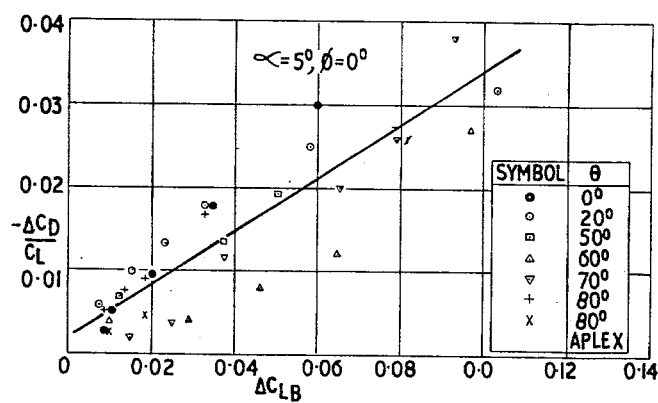
FIG. 15. VARIATION OF $\frac{\Delta C_D}{C_L}$ WITH $\Delta C_{LB}$ L.E. BLOWING ONLY
*INVENTORS*
John Smithurst Elliott
Geoffrey Michael Lilley
Alan John Alexander
John James Spillman
By Stevens, Davis, Miller & Mosher
*ATTORNEYS*

March 1, 1966     J. S. ELLIOTT ETAL     3,237,892
AIRCRAFT AERODYNAMIC LIFTING MEMBER
Filed Aug. 29, 1963                              14 Sheets-Sheet 8
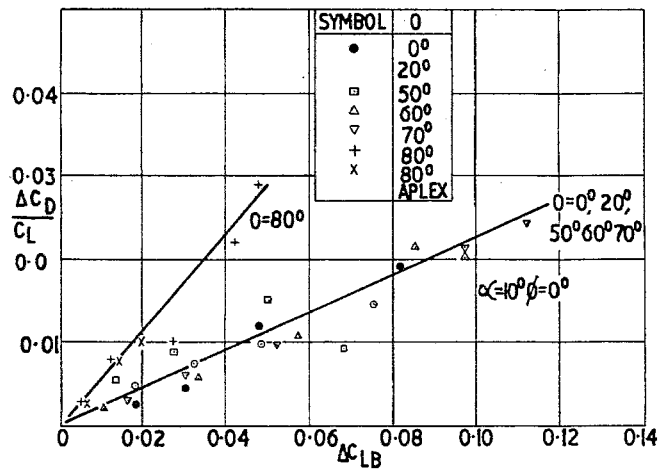
FIG. 16. VARIATION OF $\frac{-\Delta C_D}{C_L}$ WITH $\Delta C_{L_B}$ L.E. BLOWING ONLY.
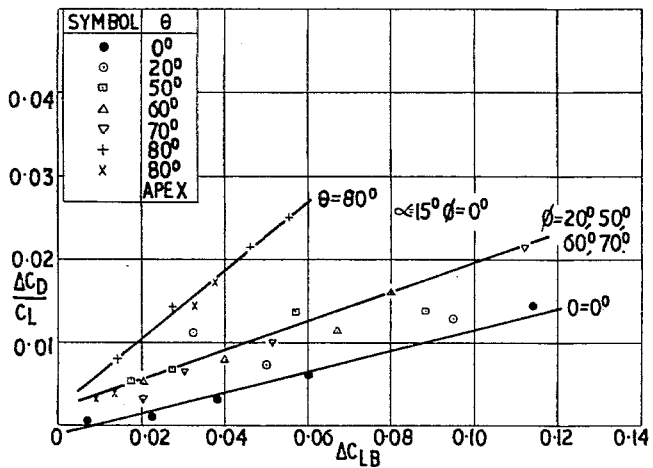
FIG. 17. VARIATION OF $\frac{-\Delta C_D}{C_L}$ WITH $\Delta C$ L.E. BLOWING ONLY
INVENTORS
John Smithurst Elliott
Geoffrey Michael Lilley
Alan John Alexander
John James Spillman
By Stevens, Davis, Miller & Mosher
ATTORNEYS

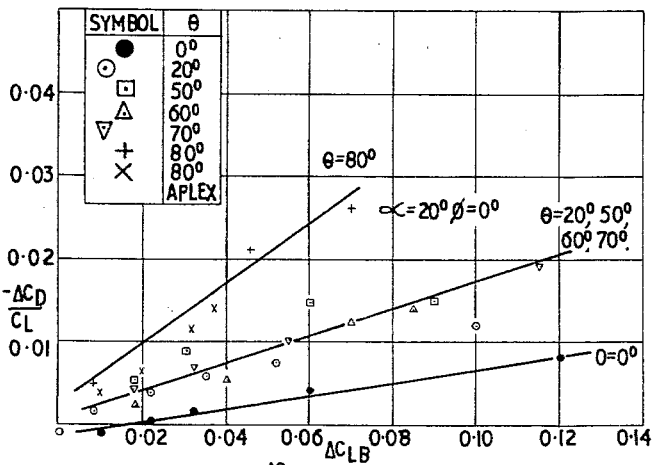
FIG. 18. VARIATION OF $\frac{-\Delta C_D}{C_L}$ WITH $\Delta C_{L_B}$ L.E. BLOWING ONLY.
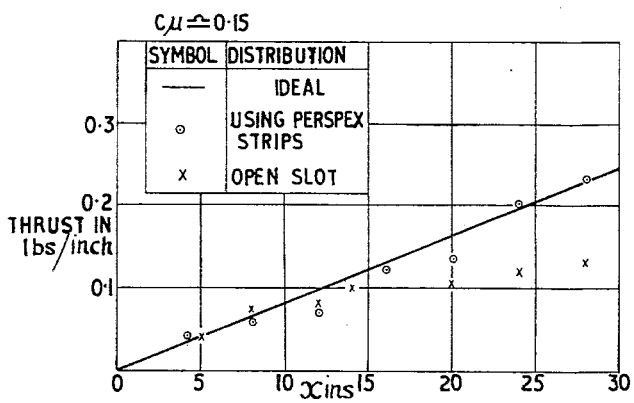
FIG. 19. BLOWING MOMENTUM DISTRIBUTION ALONG LEADING EDGE March 1, 1966 J. S. ELLIOTT ETAL 3,237,892
AIRCRAFT AERODYNAMIC LIFTING MEMBER
Filed Aug. 29, 1963 14 Sheets-Sheet 10

John Smithurst Elliott
Geoffrey Michael Lilley
Alan John Alexander
John James Spillman
Inventors
By
Stevens, Davis, Miller, & Mosher
Attorneys John Smithurst Elliott
Geoffrey Michael Lilley
Alan John Alexander
John James Spillman
*Inventors*

By
Stevens, Davis, Miller & Mosher
*Attorneys*

March 1, 1966  J. S. ELLIOTT ETAL  3,237,892
AIRCRAFT AERODYNAMIC LIFTING MEMBER
Filed Aug. 29, 1963  14 Sheets-Sheet 14

INVENTORS
John Smithurst Elliott
Geoffrey Michael Lilley
Alan John Alexander
John James Spillman
By Stevens, Davis, Miller & Mosher
ATTORNEYS United States Patent Office 3,237,892
Patented Mar. 1, 1966

3,237,892
AIRCRAFT AERODYNAMIC LIFTING MEMBER
John Smithurst Elliott, Farnborough, Geoffrey Michael Lilley, Cranfield, Bletchley, Alan John Alexander, Bromham, Bedford, and John J. Spillman, Bedford, England; said Elliott assignor to Power Jets (Research and Development) Limited, London, England, a British company
Filed Aug. 29, 1963, Ser. No. 305,288
Claims priority, application Great Britain, Aug. 29, 1962, 33,236/62
9 Claims. (Cl. 244—73)

The present invention relates to aircraft, which term is used herein to apply to craft adapted for airborne flight with or without wings.

The invention relates more particularly to means for varying the lift and control forces acting on an aerodynamic lifting member of an aircraft, for example, on an aircraft wing of low aspect ratio and a relatively highly swept edge. The invention is of especial application to aircraft of narrow gothic, detla, ogee or related plan form.

The swept edge of the wing may be constituted by a relatively highly swept-back leading edge, by a wing tip edge, by a swept-forward wing trailing edge, or jointly by a wing tip edge and a swept-back wing leading edge or a swept-forward wing trailing edge, or both of them, including cases where the leading and tip edges or the tip and trailing edges merge into one another.

The invention further has application to wingless aircraft. Such aircraft may be regarded as having wings of 90° sweep-back, and the swept edges will extend along the sides of the aircraft body which in this case constitutes the lifting member.

It is a characteristic of aerodynamic lifting members of low aspect ratio and with highly swept edges, that a substantial contribution to lift can be afforded by vortex sheets shed from the edges in forward flight. Improved aerodynamic characteristics may be obtained by modifying such vortex sheets, and in U.S. patent specification No. 3,090,584, there are disclosed arrangements whereby the formation of the vortex sheets is stimulated by ejecting from the swept edge a gaseous stream in the form of a long thin sheet.

According to the present invention, an aircraft includes an aerodynamic lifting member of low aspect ratio and having a relatively highly swept edge, lips defining a slot shaped discharge aperture extending along at least a part of the swept edge of the lifting member, and at least one jet propulsion engine arranged to discharge its total efflux as a propulsive jet stream in the form of a sheet from the slot shaped discharge aperture, the sheet being directed outwardly with respect to the aircraft centre-line and rearwardly with respect to the direction of flight of the aircraft to stimulate the shedding of a vortex sheet and to provide a rearward component of thrust for forward propulsion.

The jet stream may be discharged with a downwardly or upwardly directed component and means may be provided to deflect the jet sheet downwardly or upwardly from its normal direction of discharge.

The slot shaped discharge outlet may be of non-uniform transverse dimensions whereby the jet discharge varies in strength along the length of the slot. The slot may be of fixed area but tapered to increase or decrease in width uniformly from a forward point to a rearward point of the wing. Alternatively, the slot may be of variable area geometry to accommodate variations in engine performance and flight speeds.

Pivotable vanes may be provided at the outlets of the discharge slots to vary the angle of deflection of the jet discharge with respect to the direction of flight of the aircraft.

A plurality of jet propulsion engines may be provided, which engines are distributed along the swept edge and are arranged to discharge their effluxes through the slot shaped discharge aperture. Alternatively, the engines may be mounted elsewhere in the aircraft and be connected to supply propulsive jet streams to nozzles distributed along the swept edge. The engines or the nozzles may be located in a slot in the swept edge through which they induce an airflow by ejector effect.

According to a further feature of the invention the swept edge is provided with a slat which can be moved to open up an auxiliary intake through which one or more jet propulsion engines induce an augmenting air flow. Additionally, fans may be provided to promote such an augmenting air flow.

Alternatively, the jet sheet may be constituted solely by the jet propulsion engine efflux during all flight conditions of the aircraft.

The invention will now be described by way of example with reference to the accompanying diagrammatic drawings in which:

FIGURES 1 and 2 show details of models constructed for wind tunnel tests of the invention;

FIGURES 3 to 19 show various graphs plotted in accordance with results obtained from the models illustrated in FIGURES 1 and 2;

Figure 20:
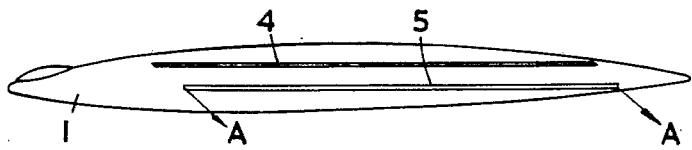
FIGURES 20, 21 and 22 are respectively side, front and plan views of an aircraft of approximately delta planform in accordance with the invention.
Figure 21:
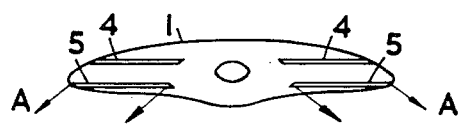
Figure 22:
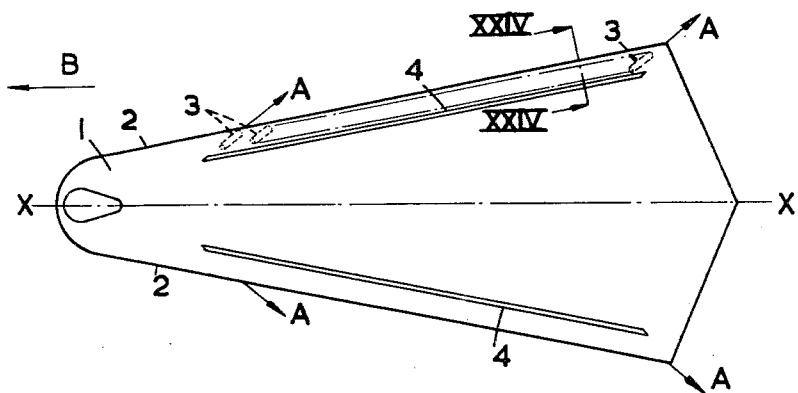
Figure 23:
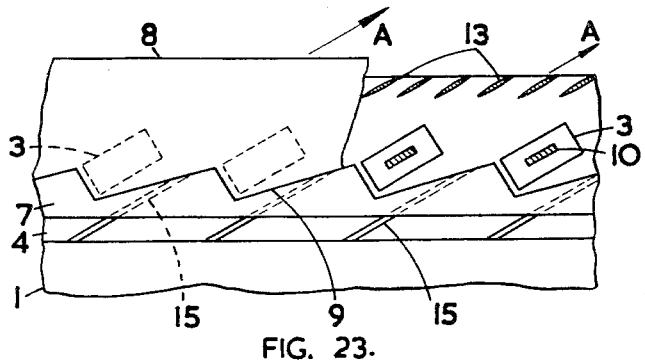
FIGURE 23 is a fragmentary plan view of the leading edge of the wing of the aircraft shown in FIGURES 20–22.
Figure 24:
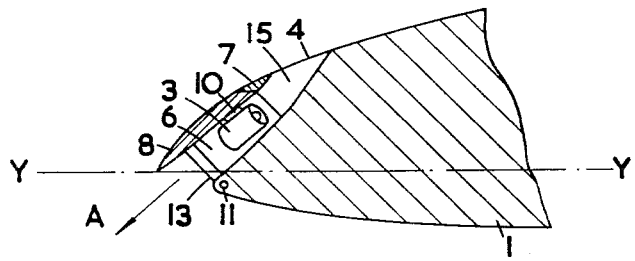
FIGURE 24 is an enlarged sectional view taken on the line XXIV—XXIV of FIGURE 22 illustrating the leading edge of the aircraft wing in its cruise configuration.
Figure 25:
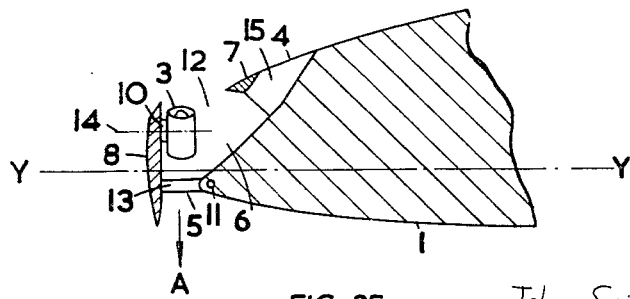
FIGURE 25 is a view corresponding to that of FIGURE 24 showing the leading edge of the aircraft wing in its take-off and landing configuration.
Figure 29:
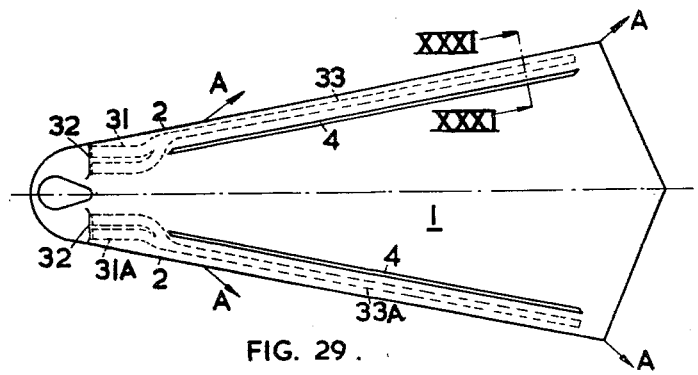
FIGURE 29 is a view corresponding to FIGURE 22 of an alternative embodiment of the invention.
Figure 30:
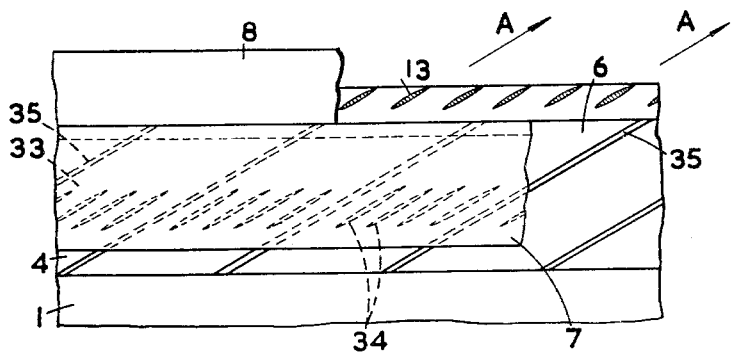
Figure 31:
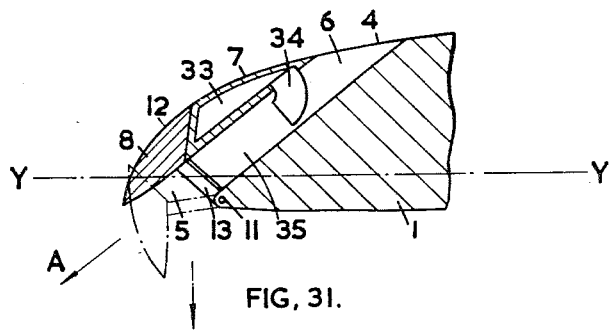
Figure 32:
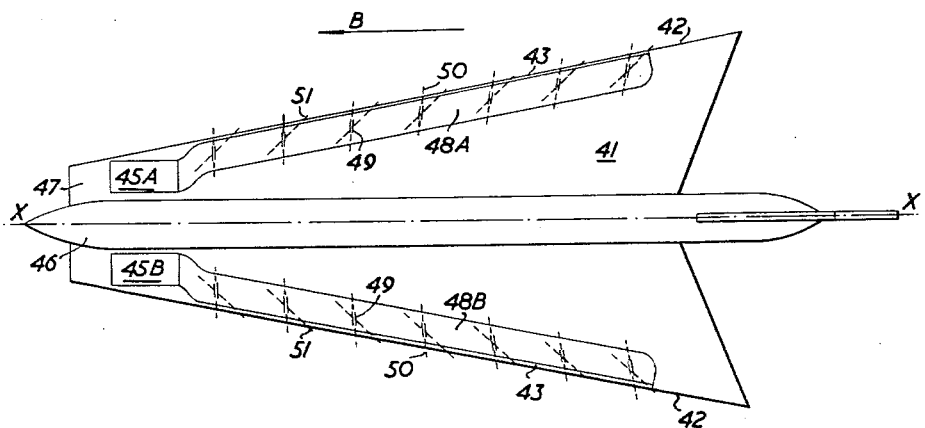
Figure 33:
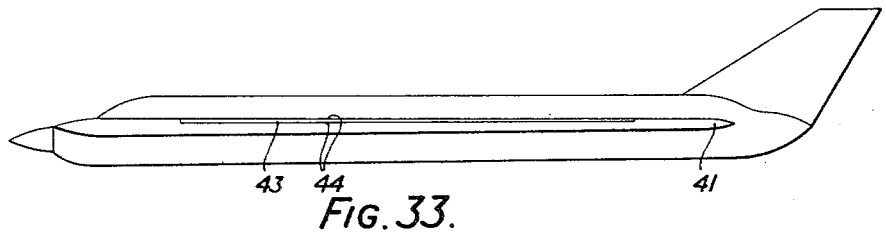

FIGURES 30 and 31 are views of the embodiment of FIGURE 29 corresponding respectively to FIGURES 23 and 24, FIGURE 31 being a sectional view on the line XXXI—XXXI in FIGURE 29, and FIGURES 32 and 33 are plan and side views of a further aircraft in accordance with the invention.

Low speed wind tunnel tests have been carried out on the wing model W illustrated in FIGURE 1. The model is a 70° swept delta wing of aspect ratio 0.73 with cropped tips and of chord equal to one third of the root chord. A slot of constant width extends around the periphery of the wing, except for a small region near the apex, and permits air under pressure supplied to the interior to be discharged along the wing leading edges (leading edge blowing) and the wing trailing edges (trailing edge blowing) as a jet sheet. To taper and direct the jet sheet leaving the slot, the slot was subdivided by a plurality of walls. The angle $\theta$ as shown in FIGURE 1 is the jet sweep angle and will be referred to hereinafter. Some preliminary tests on directing the jet sheet showed that in order to obtain a given direction for the jet sheet, it was advantageous to divide the sheet into a number of small jets each capable of being directed individually. The individual jets recombined very close to the slot into a homogeneous sheet. Tunnel wind speeds employed during the tests ranged from 50 ft./sec. to 200 ft./sec.

The tests showed that the jet sheet, formed at the wing leading edges and tips by blowing, rolls up to form leading edge vortices in a manner similar to the rolling up of the free vortex sheets formed solely by the passage of mainstream air over the wing surfaces, although the pressure boundary condition is changed since the jet sheet can now support a pressure difference.

Further tests were carried out in which the jet sheet was directed downwardly. As can be seen from FIGURE 2, the jet sheet was directed at an angle $\phi$ with respect to the horizontal plane Y—Y of the wing model W.

FIGURES 3 and 4 are graphs showing plots of lift increment due to blowing $\Delta C_{LB}$ against blowing momentum coefficient $C\mu$ i.e. total momentum ejected/$q_0.S$, where $q_0$ is mainstream dynamic pressure and S is wing area, for the case in which blowing is effected from all edges, for values of $\phi=0°$ and $30°$ respectively. It will be seen that for small values of $C\mu$ and constant geometric wing incidence $\alpha$ the lift increases quite rapidly but above values of $C\mu$ of about 0.2 the rate of increase of lift fell away. The plot also shows that for a given value to $C\mu$ the lift increment increased with wing incidence $\alpha$.

The manner in which lift varies with blowing and wing incidence can be explained in terms of the movement of the leading edge vortices. Application of swept edge blowing moves the leading edge vortices upwardly and outwardly, particularly at small geometric wing incidences $\alpha$. The outward movement is accomplished in stages. Firstly, as the blowing pressure increases from zero the entrainment effect of the jet reduces and finally eliminates the secondary separation, causing the vortex core to move towards the wing edge. Secondly, at still higher blowing pressures, the jet sheet penetrates further into the mainstream air flowing over the wing surface before rolling up, thus moving the vortex core even nearer the edge of the wing as well as upwardly away from the wing. Finally, at sufficiently high blowing pressures the vortex core will move off the wing. This upward and outward movement of the vortex core with increasing blowing momentum coefficient $C\mu$ means that the effect of the stronger leading vortex produced by blowing is reduced since its height is greater than that produced without leading edge blowing, particularly at small wing incidences, and the outward movement reduces the area of wing over which the low pressures created by the vortices are felt. Hence, the rate of increase of lift decreases with increasing $C\mu$ at constant $\alpha$. Again as $\alpha$, or more strictly $\alpha/K$, where K is the cotangent of leading edge sweep angle, increases the vortex core moves inboard so that the $C\mu$ at which $\Delta C_{LB}/C\mu$ begins to level off is increased. Thus the condition for maximum relative benefit $\Delta C_{LB}/C\mu$ will be small $C\mu$ to limit the spanwise movement of the vortex and large $\alpha/K$ to keep the change in vortex height, due to blowing, small.

Results obtained with blowing from all edges of the wing showed that the majority of the lift increment due to blowing came from the wing leading edge and that the lift increment due to wing tip and wing trailing edge blowing was relatively small. Further, simple theoretical considerations showed that to maintain conical flow over the wing model whilst employing leading edge blowing it was necessary to increase the momentum of the air ejected linearly along the swept leading edge from a zero value at the apex.

FIGURE 5 shows the lift increment due to blowing at the wing leading edge through a slot which tapers as it extends away from the wing apex, the air sheet being emitted normal to the leading edge and in the plane of the wing surface. Comparison with FIGURE 12 shows that the lift increment at a given value of $C\mu$ is increased, particularly at small $C\mu$ values. At large $C\mu$ values ($C\mu=0.5$), the gains are small since $C\mu$ is based on the total momentum ejected while the vortex movement depends upon the local $C\mu$ value which is larger for leading edge blowing only (i.e. no blowing from wing tips and trailing edges) for a given overall $C\mu$.

FIGURES 6 to 11 show the effect of directing air sheets, having small $C\mu$ values, rearwardly of the wing model at various angles of $\theta$, the jet sweep angle. The determinations were made for a number of wing incidences for each value of $\theta$. The increase in lift with the increase in $C\mu$ tends to be linear up to $C\mu$ values of at least 0.03 for $\alpha=0$. The beneficial effect of increasing (or $\alpha/K$) is clearly visible. Apart from $\theta=60°$, where the blowing distribution was poor, the effect of increasing $\theta$ is fairly small up to $\theta=70°$. At $\theta=80°$, FIGURE 11, however, with blowing over the full length of the leading edge there is a marked fall-off in lift at a given $C\mu$. This result was investigated and attributed to the blown air sheet clinging to the leading edge due to the Coanda effect instead of continuing to flow as directed, as was the case up to $\theta=70$. This Coanda effect delayed the rolling-up of the air sheets and hence reduced the strength of the leading edge vortices. To mitigate this effect with leading edge blowing at $\theta=80°$, the blowing was limited to a portion of the slot adjacent the apex of the wing model, that is to a slot exending from a point 3 inches from the apex to a point 9.5 inches from the apex. The $C\mu$ range was very much reduced owing to the smaller slot area (smaller mass flow) but the results obtained, FIGURE 12, show a considerable improvement over the results for full length leading edge blowing FIGURE 11 for the higher wing incidences.

The lift augmentation ratio $\Delta C_{LB}/C\mu$ is plotted against jet sweep angle $\theta$ in FIGURE 13 for a $C\mu$ value of 0.01, corresponding approximately to the cruise value. This graph clearly shows that the effect of increasing $\theta$ is small up to 70° but is large at greater angles where the jet sheet clings initially to the leading edge.

The problem of drag was also investigated. In FIGURE 14 drag was plotted against lift, blowing being effected on all edges, for $C\mu$ values of 0 and 0.178. It can be seen that blowing increased the drag at small wing incidences due to a small forward component of thrust, but drag was less at higher values of lift due to a reduction in the lift-dependent drag.

With blowing, at constant wing incidence, the drag will consist of four parts:

$$C_{DB}=C_{D\text{no blow}}-C\mu \cos(110-\theta)\cos\alpha + \Delta C_{LB}\tan\alpha + \Delta C_D$$

The first term on the right hand side of this equation is the drag coefficient without blowing, the second term is the direct thrust component due to leading edge blowing, the third is the increment of induced drag due to the increased lift and the last term is a small thrust arising because the increased lift due to blowing acts on the forward part of the wing producing suction forces which act on the forward facing surfaces. The first term can be obtained from FIGURE 14 and the second and third terms are easily calculated, so the remaining term which is, in effect, a reduction in induced drag was plotted in the form $-\Delta C_D/C_L$ against $\Delta C_{LB}$, FIGURES 15–18, for values of $\alpha=5°, 10°, 15°, 20°$ and values of $\theta$ of 0°, 20°, 50°, 60°, 70°, 80°. The values of $-\Delta C_D$ are small and there is a good deal of scatter in the results. In general there is a tendency for $-\Delta C_D/C_L$ to increase with $\theta$ but the results for $\theta=80$ are probably less reliable than the others.

Finally, FIGURE 19 shows a graph which illustrates the blowing momentum distribution along the leading edge of the wing model.

In order to appreciate the significant improvement in performance to be obtained with an aircraft in accordance with the invention, a comparison will now be made between a supersonic aircraft of conventional form and an aircraft in accordance with the invention, both aircraft being of like dimensions and weight.

The rear engine mounted conventional aircraft considered has a gross weight of 300,000 lbs. and a maximum total thrust of 100,000 lbs. For the sake of comparison, it is assumed to have a geometric wing incidence equal to 4° and a lift/drag ratio of 8 ($C_L$=0.1; $C_D$=0.0125). The aircraft in accordance with the invention is of like configuration but has engines mounted adjacent the aircraft nose. The engines' effluxes are exhausted in the form of a gaseous sheet from fish tail nozzles mounted at the wing leading edge adjacent the wing apex. The sheet is discharged in the plane of the wing at an angle of 15° to the aircraft centre line.

For cruising, the assumption is made that the lift increment due to blowing/blowing momentum coefficient =1.0 and hence for the same lift coefficient ($C_L$=0.1) the geometric wing incidence is reduced with a consequent reduction in lift dependent drag.

Under these conditions it can be shown that a thrust of only 90% of the thrust of the conventional aircraft is required for the aircraft in accordance with the invention at a geometric wing incidence =3.3° and that the lift/drag ratio is increased to 8.97, which represents an increase of 12% even without considering a further allowance for the consequential decrease in fuel and engine weights.

For take off, the lift increment due to blowing/blowing momentum coefficient will be larger than for cruise due to a greater geometric wing incidence equal to 15°. The wing of a conventional aircraft is assumed to give a lift coefficient of 0.5 at this incidence, whereas in an aircraft in accordance with the invention, the lift coefficient will equal 0.65 with a blowing momentum coefficient of 0.195. Thus the take off speed of an aircraft in accordance with the invention is reduced by approximately 12%.

On landing, the lift coefficient of an aircraft in accordance with the invention reaches 0.79 at a blowing momentum coefficient of 0.417 which represents a reduction in landing speed of 20%.

From the above comparison it is evident that the application of the present invention to supersonic aircraft brings about appreciable gains in cruise and take off performance and very substantial gains in landing performance, which is in many cases the limiting factor in present day designs. Furthermore, an aircraft in accordance with the invention will be considerably quieter than a conventional aircraft of comparable dimensions and thrust, a noise reduction of approximately 10 decibels would appear feasible.

The important fact to be seen from the results is that the values of $\Delta C_D$ are always negative, that is there is a small increment of thrust over and above that attributable to the direct thrust component of the blown air stream. With an aircraft designed to utilise its full power output for leading edge blowing this would bring a further increase in the lift/drag ratio, quite apart from obvious gains due to lower induced drag at a given lift coefficient.

These experimental results show that the application of very highly swing wing surfaces and leading edge blowing to full scale aircraft can lead to considerable gains in pressure lift with little or no direct thrust loss, at least for aircraft speeds up to about Mach 2. Some embodiments of aircraft embodying these features are now to be described.

FIGURES 20 to 25 show an aircraft having a low aspect ratio wing 1 approximately of delta planform and highly swept-back leading edges 2. In these embodiments, the angle of sweep-back is shown to be approximately 80°. The aircraft is powered by a number of gas turbine jet propulsion engines 3, preferably of the by-pass or ducted fan type, evenly distributed along each of the swept leading edges. These engines draw in air through elongated intakes 4 in the wing upper surface and discharge their combined jet streams as long thin jet sheets through elongated discharge apertures 5, defined by lips 5A, extending along the wing leading edges. As can be seen from FIGURE 22 the engines are arranged obliquely with respect to the aircraft centre line X—X so as to discharge the jet sheets rearwardly (as indicated by arrows A) with respect to the direction of flight and outwardly (as indicated by arrow B) with respect to the aircraft centre line X—X. In this embodiment, the jet sheet is discharged at an angle of approximately 30° with respect to the wing leading edge.

Referring now to FIGURES 23 and 24 an elongated slot 6 is provided adjacent each wing leading edge and extends through the wing and connects the intake 4 to the discharge aperture 5. The engines 3 are mounted in line within the elongated slot 6. In this embodiment, the engines 3 and the discharge aperture 5 are disposed so that the jet sheet A is discharged with a downwardly directed component relative to the horizontal plane Y—Y of the aircraft wing, in addition to the rearwardly and outwardly directed components arising from the oblique disposition of the engines.

The engines are spaced apart from one another within the elongated slot 6 and induce by ejector effect an augmenting air flow around and between the engines, which flow is discharged through the aperture 5 with the engine jet streams.

In cruising flight, the rearwardly directed component of engine jet thrust provides the total means of forward propulsion for the aircraft. The outwardly and downwardly directed components energise or stimulate the vortices shed from the swept leading edges, and by forcing these vortices outwardly, increase the effective aspect ratio of the wing so as to reduce the induced drag coefficient. An engine-wing integration effect is thereby achieved in which the engine jet stream, as well as affording forward thrust, modify the aerodynamic characteristics of the wing.

The outer wall of the elongated slot 6 is constituted by a fixed wall part 7 and a slat 8 which are separable along the zig-zag line 9 as shown in FIGURE 23 (where part of the slat is shown as broken away). The engines 3 are attached to the slat by mountings 10, and the slat is pivotally mounted on suitable supports (not shown in FIGURE 23) to turn about a shaft 11 extending along the edge of the discharge aperture 5. For take-off and landing the slat 8 together with the engines 3 is turned to the position shown in FIGURE 25 so that the jet sheet is discharged downwardly to give an upwardly directed thrust. Movement of the slat opens an auxiliary intake 12 between the slat and the fixed wall part 7 through which the engines induce by ejector effect a further augmenting air flow which is discharged downwardly with the engine jet streams through the discharge aperture 5. In this way an increased lifting thrust is obtained while noise and ground erosion is reduced.

Pivotable vanes 13 are positioned adjacent the discharge aperture 5, each vane being mounted to pivot about its longitudinal axis. In cruising flight these vanes are set as shown in FIGURE 23 in alignment with the rearwardly and outwardly directed jet streams from the engines and thereby counteract any tendency for the jet streams to leave the wing leading edge at right angles thereto rather than obliquely. On take-off and landing the vanes may be turned on their pivotal axes to divert the jet streams forwardly or rearwardly for control. Alternatively or in addition some or all of the engines 3 may be mounted to pivot about transverse axes, as at 14, for the same purpose. The vanes 13 turn with the slat 8 about the shaft 11 and may constitute the support of the slat from the main body of the wing.

The intake 4 of the elongated slot 6 is provided with splitters 15 which support the fixed wall part 7 from the main body of the wing. These splitters extend parallel to the longitudinal axes of the engines 3, when the latter are in the cruise position, so as not to interfere with the augmenting flow around and between the engines.

Figure 26:
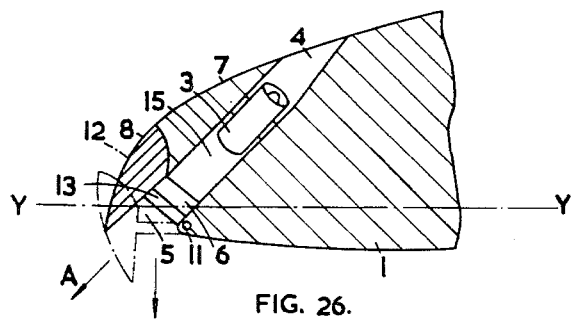
FIGURE 26 is a view corresponding to FIGURE 24 of a modified form of the aircraft shown in FIGURES 20 to 25.

FIGURE 26 shows a modified form of the embodiment just described, corresponding components having like reference numerals. In this modification the engines 3 are mounted in the elongated slot 6 between the main body of the wing and the fixed wall part 7 instead of being mounted on the slat 8. In cruising flight, the engines discharge their jet efflux as a sheet A directed rearwardly, outwardly and downwardly as in the previously described embodiment, the jet efflux being augmented by the air flow through the slot around and between the engines. As before, the slat 8 can be turned on take-off and landing about axis 11 to the position shown in broken lines and the engines 3 then induce an augmenting flow through the auxiliary intake 12 between the slat and the fixed wall part 7. Control may be effected by swivelling the vanes 13.

Figure 27:
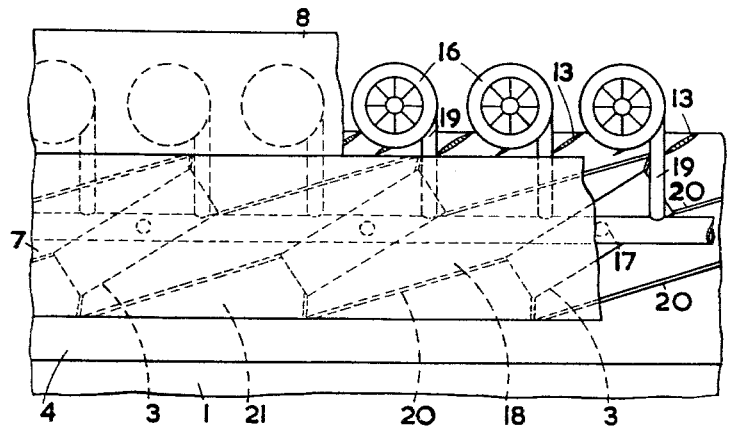
FIGURES 27 and 28 are views corresponding to FIGURES 23 and 24 respectively of yet another modification.
Figure 28:
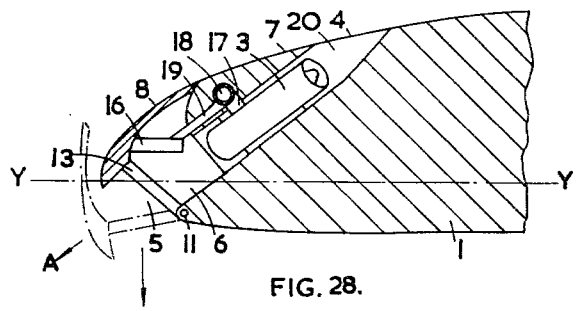

In the embodiment of FIGURES 27 and 28 (in which corresponding reference numerals are again used for corresponding components) the engines 3 are again mounted in the elongated slot 6 on the fixed structure of the wing. The aircraft further comprises rows of fan units 16 mounted with their axes substantially vertical in the wing leading edges. These fans are supported from the fixed wall part 7, and in cruising flight are overlaid by the slat 8. Each fan unit comprises a rotor carrying a row of compressor rotor blades and a row of turbine rotor blades mounted on the tips of the compressor blades, and an inlet volute for supplying working fluid to the tip turbine blades. Such fan units are disclosed in British Patent No. 811,840. Each engine 3 has a bleed outlet 17 through which compressed air or exhaust gases are led to a common distributing duct 18 extending along the wing leading edge, and branches 19 connect the duct 18 to the inlet volutes of the fans 16.

In cruising flight, the bleed outlets 17 are closed (by valves or the like) and the fans are inoperative. As before the engines discharge their jet streams as rearwardly, outwardly and downwardly directed sheets A. In this embodiment, however, the intake 4 of the elongated slot 6 is divided by walls 20 to provide individual intake passages 21 for the engines 3 so that there is no augmenting flow between and around the engines. For take-off and landing, the slat 8 is turned to the position shown in broken lines in FIGURE 28 to open the auxiliary intake 12, while the valves in the bleed outlets 17 are opened so that working fluid is supplied to the common distributing duct 18 from which the fluid is passed via the branches 19 to drive the fans 16. The fans draw in air through the auxiliary intake 12 and discharge compressed air vertically downwardly to produce a lifting thrust in addition to that afforded by the downwardly deflected engines effluxes. The fans and engines also induce a further augmenting air flow by ejector effect through the auxiliary intake 12 around and between the fans.

FIGURES 29, 30 and 31 show a somewhat different form of the invention. As before the aircraft has a wing 1 approximately of narrow delta planform and each of its swept-back leading edges 2 is formed with an elongated slot 6 extending between an intake 4 in the wing upper surface and a discharge aperture 5 in the leading edge. The outer wall of the slot 6 is constituted by a fixed wall part 7 and a slat 8 mounted to turn about an axis 11 extending along the edge of the discharge aperture 5 which is provided with vanes 13. In this embodiment the aircraft is powered by two groups of gas turbine jet propulsion engines 31, 31A arranged to draw in air through forwardly facing intakes 32 which may be designed for efficient operation in supersonic flight. The engines 31, 31A are connected to discharge their exhaust streams into common distributing ducts 33A, 33B respectively, extending along the wing leading edges within the fixed wall parts 7 and these ducts supply a series of ejector nozzles 34 within the slot 6.

The slot 6 is divided by a series of obliquely arranged splitters 35 and the ejector nozzles are arranged to discharge parallel to the splitters. The ejectors induce a flow of air through the slot and the arrangement of the ejector nozzles and splitters and of the outlet aperture 5 and vanes 13 is such that a propulsive jet stream is discharged as a rearwardly, outwardly and downwardly directed sheet A which has the effect previously described.

For take-off and landing the slat 8 may be turned to the position shown in broken lines in FIGURE 31 so that an augmenting flow is induced through an auxiliary intake 12.

In an embodiment of the invention similar to those described, an aircraft has a fuselage and opposite wings, the trailing edges of which are swept forward at a relatively large angle, for example 80°. Each of the trailing edges if formed with a slot extending therethrough from an intake in the wing upper surface to a discharge aperture in the trailing edge. The aircraft is powered by groups of gas turbine jet propulsion engines which supply their jet stream to ejector nozzles disposed in the slots, the general arrangement of the slot and ejectors being similar to that shown in FIGURE 31. The arrangement of the ejector nozzles, slot and discharge aperture is such that the engine jet streams with the augmenting air flow induced thereby are discharged as rearwardly, outwardly and downwardly directed jet sheets. These sheets afford forward propulsion and in addition stimulate the formation of vortices shed from the swept-forward wing trailing edges.

In this aspect the invention may be regarded as affording a way whereby the jet flap principle may be applied to aircraft wings of relatively low aspect ratio.

As in previously described embodiments, the outer wall of the slot at its outlet end is constituted by a slat which can be turned to open up an auxiliary intake through which an augmenting flow may be induced.

The ejector nozzles supplied from engines mounted elsewhere in the aircraft could be replaced by a series of relatively small engines distributed along the trailing edges in a manner analogous to that shown in FIGURES 20–28.

In the embodiments described in accordance with FIGURES 20–31, the jet streams are at all times discharged with a downwards component. However, in some applications, the arrangement of the slot and engines might be such that the streams are discharged horizontally in the plane of the wing in cruising flight, and are deflected downwardly, for example, when the aircraft is taking off, landing or climbing.

FIGURES 32 and 33 show an aircraft having a wing 41 approximately of narrow delta form, each of its swept-back leading edges 42 having an elongated discharge aperture 43 defined by lips 44 extending over a major part of the leading edge. The aircraft is powered by groups of jet propulsion engines 45A and 45B mounted adjacent the nose 46 of the aircraft, and arranged to draw in air through a forwardly facing intake 47. Each group of propulsion engines 45A and 45B is connected to discharge the exhaust streams of the engines of that group into common distributing ducts 48A and 48B which communicate with the discharge slots 43. As can be seen from FIGURE 14, the slot is of fixed area but tapered to decrease in width uniformly from a forward point to a rearward point of the wing. Pivotable vanes 49 are positioned in the distributing ducts 48A and 48B and are movable to control the angle of discharge of the jet streams through the discharge apertures 43.

In operation, the jet propulsion engines of each group 45A and 45B discharge their combined exhausts into the distributing ducts 48A and 48B from which the exhausts are conveyed to the discharge apertures 43. The jet sheets constituted by the engines' exhausts are discharged from the slots 43 in a direction outwardly with respect to the aircraft centre-line X—X and in the plane of the wing to stimulate the shedding of vortex sheets for lift purposes and rearwardly with respect to the direction of flight, indicated by the arrow B, for forward propulsion. During take-off the vanes 49 are positioned, as shown by broken lines 50, to direct the jet sheets predominantly outwardly and with a component of thrust downwardly in order that maximum lift is obtained but with a comparatively small rearward component for forward propulsion at low flight speeds. During normal cruising and high speed flight of the aircraft the vanes 49 are positioned as shown by broken lines 51, whereby the jet sheet is discharged outwardly and in the plane of the wing, but with an increased component of thrust for added forward propulsion. The strength of the jet sheet discharge is controlled by the taper of the slot.

Pivotable flaps may be provided along each swept edge of the wing such that the jet sheet is discharged over the flaps, the flaps being pivotable downwardly and upwardly either together or differentially such that the jet sheet may be discharged from the swept edge with a downward or upward component. In this respect the invention may be applied to aircraft which take off and land vertically.

The discharge apertures 43 may extend along a part or the entire length of the leading edge of the wings of the aircraft. In an alternative embodiment, the groups of jet propulsion engines 45A, 45B discharge their combined exhausts into a common distributing duct which communicates with the apertures 43 extending along each wing leading edge.

Alternatively, each group of propulsion engines 45A, 45B may be connected to discharge their exhausts into ducts communicating with different sections of each aperture 43.

In an alternative embodiment to that just described, an aircraft has a fuselage and wings of low aspect ratio, the trailing edges of which are swept-forward at a relatively large angle. Each of the swept-forward trailing edges has an elongated discharge aperture, similar to the apertures 5 of FIGURES 32 and 33, and the aircraft is powered by groups of jet propulsion engines mounted adjacent the nose of the aircraft.

The arrangement of the engines and the discharge apertures is such that the engines' exhausts are discharged as rearwardly and outwardly directed jet sheets. These sheets provide forward propulsion for the aircraft and also stimulate the formation of vortices shed from the swept-forward wing trailing edge. The sheets may also be discharged with a downward component of thrust during take-off conditions of the aircraft.

The invention could be further be applied to tip edges of aircraft wings, that is edges with 90° sweep back.

It is a feature of the present invention that the jet sheets are discharged from the swept edges with outwardly directed components of thrust, and it follows that the invention has no application to swept-back trailing edges or swept-forward leading edges of wings. Further the outwardly directed components of discharge represent a loss in forward thrust, and it will be appreciated that the compensating gain arising from the stimulation of the shed vortices is obtained only where the sweep back angle of the leading edge or the sweep-forward angle of the trailing edge is quite large. Specifically, it is to be noted that in the case of swept back leading edges, the rearwardly directed component of the jet sheet is limited by the angle of sweep back, and by the difficulty of ensuring that the sheet leaves the leading edge obliquely rather than at right angle. Hence a high degree of sweep back is required.

The noise produced by an aircraft in accordance with the present invention will be considerably reduced under all operating conditions as compared with an aircraft having engines developing a similar thrust discharging into a conventional jet pipe. This considerable reduction in noise will occur due to the rapid diffusion of the propulsive exhausts as described, and will not be accompanied by any loss in thrust.

We claim:

1. An aircraft including a wing of low aspect ratio and having a highly swept-back leading edge, lips defining a slot shaped discharge aperture extending along at least a part of the wing leading edge, and at least one jet propulsion engine arranged to discharge its total efflux as a propulsive jet stream in the form of a sheet from the slot shaped discharge aperture, the sheet being directed outwardly with respect to the direction of flight of the aircraft to stimulate the shedding of a vortex sheet and to provide a rearward component of thrust for forward propulsion of the aircraft.

2. An aircraft including a wing of low aspect ratio and having a highly swept-back leading edge, lips defining a slot shaped discharge aperture of non-uniform transverse dimensions extending along at least a part of the wing leading edge, and at least one jet propulsion engine arranged to discharge its total efflux as a propulsive jet stream in the form of a sheet from the slot shaped discharge aperture, which sheet varies in strength in accordance with the transverse dimensions over the length of the slot and is directed outwardly with respect to the aircraft centre-line and rearwardly with respect to the direction of flight of the aircraft to stimulate the shedding of a vortex sheet and to provide a rearward component of thrust for forward propulsion of the aircraft.

3. An aircraft as claimed in claim 2, in which the slot shaped discharge aperture is of fixed area but tapered to decrease in transverse dimension uniformly from a forward point to a rearward point of the wing.

4. An aircraft including a wing of low aspect ratio having a leading edge swept-back to an angle between the range 60°–80° and a geometric wing incidence between the range 5°–20°, lips defining a slot shaped discharge aperture extending along at least a part of the leading edge and at least one jet propulsion engine arranged to discharge its total efflux as a propulsive jet stream in the form of a sheet from the slot shaped discharge aperture, the sheet being directed outwardly with respect to the aircraft centre-line and rearwardly at an angle between the range 0° and 80° from a line drawn normal to the leading edge.

5. An aircraft including a wing of low aspect ratio and having a highly swept-back leading edge, lips defining a slot shaped discharge aperture extending along at least a part of the leading edge, a plurality of spaced apart pivotable vanes disposed in the slot shaped discharge aperture and at least one jet propulsion engine arranged to discharge its total efflux as a propulsive jet stream in the form of a sheet from the slot shaped discharge aperture, the sheet being directed outwardly with respect to the aircraft centre-line and rearwardly with respect to the direction of flight of the aircraft to stimulate the shedding of a vortex sheet and to provide a rearward component of thrust for forward propulsion of the aircraft.

6. An aircraft as claimed in claim 5 in which means are provided to direct the jet sheet emitted from the slot shaped discharge aperture downwardly with respect to the plane of the aircraft wing.

7. An aircraft including an aerodynamic lifting member of low aspect ratio and having a highly swept edge, lips defining a slot shaped discharge aperture extending along at least a part of the swept edge of the lifting member, a plurality of jet propulsion engines distributed along the swept edge and arranged to discharge their effluxes through the slot shaped discharge aperture as a homogeneous sheet, the sheet being directed outwardly with respect to the aircraft centre-line and rearwardly with respect to the direction of flight of the aircraft to stimulate the shedding of a vortex sheet and to provide a rearward component of thrust for forward propulsion of the aircraft.

8. An aircraft as claimed in claim 7 in which the plurality of jet propulsion engines are mounted within an elongated slot formed in the aerodynamic lifting member, the elongated slot having a wall portion constituted by a slat, which slat is moveable to open an auxiliary intake through which the jet propultion engines induce an augmenting airflow.

9. An aircraft including an aerodynamic lifting member of low aspect ratio and having a highly swept edge, lips defining a slot shaped discharge aperture extending along at least a part of the swept edge of the lifting member, a plurality of jet propulsion engines mounted adjacent the nose of the aircraft, ducting to communicate with the outlets of the jet propulsion engines, which ducting communicates at its other end with the slot shaped discharge aperture, the jet propulsion engines being arranged to discharge their total effluxes via the ducting as a propulsive jet stream in the form of a sheet from the slot shaped discharge aperture, the sheet being directed outwardly with respect to the direction of flight of the aircraft to stimulate the shedding of a vortex sheet and to provide a rearward component of thrust for forward propulsion of the aircraft.

References Cited by the Examiner

UNITED STATES PATENTS

| | | | |
|---|---|---|---|
| 2,941,751 | 6/1960 | Gagarin | 244—42 |
| 2,982,495 | 5/1961 | Griffith | 244—55 X |
| 3,090,584 | 5/1963 | Kuchemann | 244—42 |
| 3,117,643 | 1/1964 | Cockerell | 244—23 X |

MILTON BUCHLER, *Primary Examiner.*

ANDREW H. FARRELL, *Examiner.*